Figure 6:
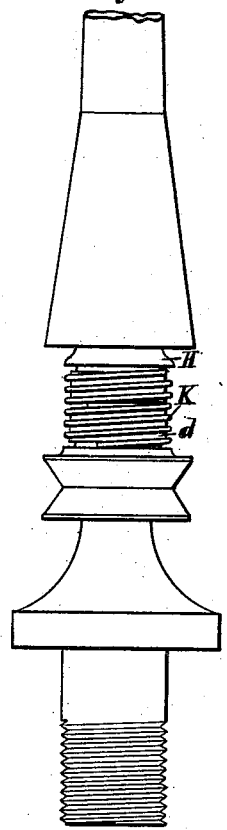

(No Model.) 2 Sheets—Sheet 1.
E. DUMMER.
SPINNING SPINDLE AND BEARING THEREFOR.
No. 336,903. Patented Mar. 2, 1886.
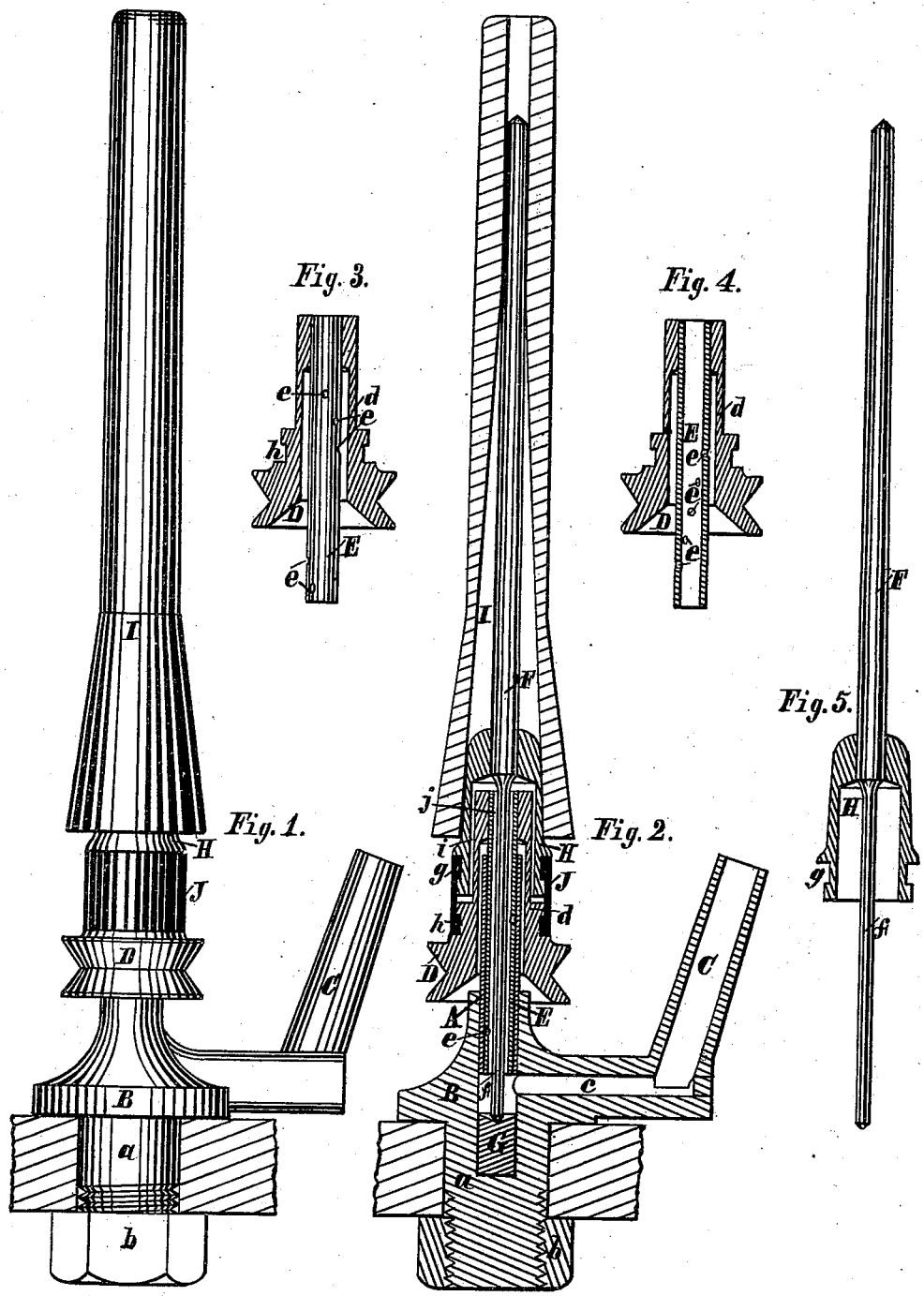

(No Model.) 2 Sheets—Sheet 2.
E. DUMMER.
SPINNING SPINDLE AND BEARING THEREFOR.
No. 336,903. Patented Mar. 2, 1886.

Attest:
Geo. R. Gordon,
Henry F. Shaw.

Inventor;
Edward Dummer.

UNITED STATES PATENT OFFICE.

EDWARD DUMMER, OF BOSTON, MASSACHUSETTS.

SPINNING-SPINDLE AND BEARING THEREFOR.

SPECIFICATION forming part of Letters Patent No. 336,903, dated March 2, 1886.

Application filed August 18, 1882. Serial No. 69,635. (No model.)

*To all whom it may concern:*

Be it known that I, EDWARD DUMMER, a citizen of the United States, of Boston, in the county of Suffolk and State of Massachusetts, have invented a new and useful Improvement in Spinning-Spindles and Bearings Therefor, of which the following is a specification, reference being had to the accompanying drawings.

My invention relates to that class of live-spindles and their bearings for spinning and twisting which are so constructed and adapted that the spindles, together with the bobbins and loads of yarn thereon, if unbalanced, are free to revolve around a common center of gravity, and are not restrained to revolve around their geometrical center.

The objects of my invention are to so connect the spindle with the whirl that the driving-band may not exert a side pressure directly on the spindle, nor act to deflect or vibrate the same, and to have bearings that may be kept perfectly and constantly oiled.

My invention consists of certain organizations of elements in which the spindle has a yielding, flexible, or elastic connection with the whirl or whirl-shaft. The whirl has a hollow shaft to revolve in a fixed tube providing an unobstructed passage, so that oil may enter said hollow shaft, flow freely therein, and be thrown outward through openings in the sides against the interior surface of said fixed tube, and the spindle bears directly on no other fixed bearing than downward on a step, being otherwise supported by said yielding, flexible, or elastic connection.

In the drawings—two sheets—Figure 1 is an external view of a spindle having a bobbin thereon and a bearing therefor embodying my invention, a part of a spindle-rail to which the bearing is attached being shown in section. Fig. 2 is a central vertical section of all of the same but the spindle, which is shown in full. Fig. 3 is a section of whirl and an external view of whirl-shaft. Fig. 4 is a section of whirl and whirl-shaft. Fig. 5 shows the spindle and a section of the cap or shell fixed thereto. Figs. 6, 7, 8, 9, and 10 are to be referred to hereinafter in statements as to modifications of the device.

It has been customary to so construct the bearings for spindles designed to revolve about the center of gravity, as above stated, that the spindle will be held by a supporting-tube, between which and the fixed bearings there is a yielding medium, and to connect the whirl fixedly to the spindle. With such an arrangement the spindle must be more or less influenced by the driving-band, tending, as it does, to deflect or vibrate the spindle, and said yielding medium must have greater rigidity than might otherwise be required. I place the yielding medium between the whirl or whirl-shaft and the spindle. In this position said medium may be sufficiently elastic to bring the geometric center of the spindle while at rest practically in line with the center of whirl and whirl-shaft, and at the same time be sufficiently flexible to permit the spindle and its load to revolve around their center of gravity with great freedom. The whirl and whirl-shaft, which are easily constructed so that their geometrical center and center of gravity coincide, I support by a fixed bearing. Thus the spindle and its load while revolving are free from any outside disturbing force, like a spinning-top, the driving-power acting thereon directly as torsion, the spindle being acted on at all sides alike. When the spindle or shaft which moves against a bearing is solid, and oil is received only between the spindle or shaft and the bearing, as is common, the oil is with difficulty kept between the spindle or shaft and the bearing not only by being pressed out, but when there are openings in the sides of the bearing by being forced out by centrifugal action. By making the shaft which moves against the bearing—that is, the whirl-shaft—hollow I utilize this centrifugal action, which in an increased degree tends to force oil between said shaft and its bearing, the hollow shaft receiving oil at its end and having openings in its sides. Not only is the bearing thus kept oiled, but there is more or less circulation of oil—namely, up the hollow shaft, outward through the side openings, and endwise outward from the tubular bearing. The end of the spindle itself which bears on the step runs in oil. Thus all the bearings where there is friction may be copiously and constantly oiled. No woven fabric or like material, which acts to obstruct the movement of the oil, is necessary to hold the oil or convey it to the bearings; but the oil flows freely. The yielding medium between the spindle and the whirl or whirl-shaft, though of a character to absorb oil, may be so placed that it need not come in contact with the oil, and hence may be kept dry.

In the drawings is shown that particular construction of my spindle and bearing therefor which is at present most approved. There are, however, modifications which may be made, and my invention, as to the whole or a part, be involved, some of which are hereinafter specified. According to the form shown, there is a vertical tubular bearing or fixed supporting-tube, in which, to revolve therein, is a tube firmly secured at the upper end to the whirl or an extension thereof. The whirl and extension have a tubular central recess, so that they may extend down on the outside of the fixed supporting-tube, and that the whirl may receive the driving-band about opposite the longitudinal center of the surface of bearing of the whirl-shaft against the fixed tube. The spindle extends down within the whirl tube or shaft, and bears at its lower end on a step. A cap or shell, firmly secured to the spindle, extends over and about the upper part of the extension of the whirl. There is a sufficient space between the spindle and the whirl tube or shaft and between said cap or shell and the extension of whirl for the required sidewise movement of the spindle. An elastic or flexible band or yielding medium is fixed about said cap or shell and extension of whirl, being let into a suitable groove in each, to keep the two in proper relative position longitudinally. This yielding connection—preferably a short tube of rubber, or cloth and rubber, which may be readily applied and cheaply renewed—is of a nature and so placed that when the spindle and whirl are at rest the geometrical center of the spindle will be brought practically in line with that of the whirl, and that when they are revolving the spindle and its load may revolve about their center of gravity with but slight resistance. Oil is admitted into the lower part of the supporting tube, may flow freely over the step, around the lower end of the spindle, up the hollow whirl-shaft, and through openings in the sides of said shaft, and hence along the surface of the bearing of said shaft against the supporting fixed tube. Moreover, the oil will be forced by centrifugal action through said openings.

Since there can be no strain on that part of the spindle below the cap or shell arising from any sidewise thrust, it may be quite small, and, therefore, the whirl tube or shaft may be small—in fact, of no greater diameter than that of the bearing part of spindles as commonly constructed.

Referring to the drawings, the supporting fixed tube A is rigidly connected to a flange, B, by which it may be suitably mounted upon the spindle-rail and held thereon by means of a threaded neck, $a$, and nut $b$. There may be a projecting tube or reservoir for oil, C, extending upward sufficiently and opening into a passage, $c$, leading to the lower part of the supporting-tube. The supporting-tube A may be formed as one piece with the base B when the whole is made of metal suitable for a bearing. The whirl D has an extension, $d$, which is rigidly joined to a tube or hollow shaft, E. The whirl and its extension have a central tubular opening, so that they may extend down and about the tube A, and need have no place of bearing against the exterior surface of the tube A. The tube or whirl-shaft E fits the tube A so as to revolve therein. To equalize the wear of the bearing-surfaces of the shaft E and tube A, the whirl is located opposite the longitudinal center of said surfaces, as shown. There are openings or holes $e$ in the sides of the hollow shaft E, as many and located as may be deemed best. The spindle F has the lower part, $f$, of small diameter, so as to extend down within the whirl-shaft E and leave an open space between the spindle and shaft. The lower end of the spindle bears on a step, G. The recess in the upper surface of the step, if there be any recess at all, should be quite shallow and flaring, so as not to restrain the spindle at this point in any great degree.

At the proper place on the spindle F a cap or shell, H, is rigidly joined. This cap projects over and extends down and about the extension $d$ of the whirl. The upper part of this cap may be formed to enter the lower end of a bobbin, I, as shown. An elastic or flexible band, J, is placed around the lower part of the cap H and a part of the whirl or extension $d$ thereof. The cap has a groove, $g$, and the whirl or extension a groove, $h$, the band J being fitted to enter the grooves, as shown. This band will support the spindle in the manner previously specified, and, owing to the grooves $g$ and $h$, will keep the whirl in proper position longitudinally with reference to the spindle. There is the required space between the cap or shell H and the whirl or its extension $d$ to permit as much lateral play of the spindle as is necessary. Said space should, however, be not much greater than needful for the purpose named, in order that, should any accidental lateral thrust come on the spindle—such, for instance, as might occur in putting on or doffing the bobbin—it would be resisted by the shell H pressing against the extension of the whirl, rather than the part $f$ of the spindle bearing against the tube or whirl-shaft E.

Figure 7:
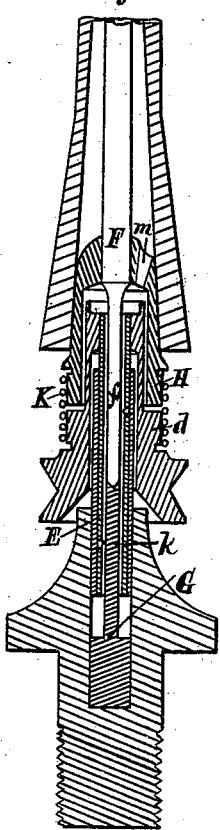

The modifications referred to above are as follows:

Instead of a band, J, of rubber or like material, a wire wound like a spiral spring might be employed, as illustrated in Figs. 6 and 7 at K, or a short tube, L, slitted through a part of its length, (shown in Fig. 10,) the latter being as small wires or springs held in place so as to be longitudinal with and on the outside of the shell H and extension $d$.

Figure 8:
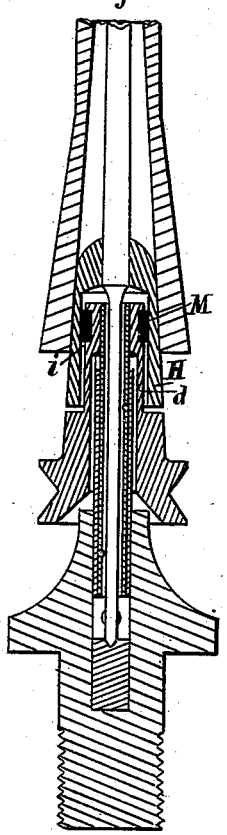

Instead of the band J upon the outside, an elastic, flexible, or yielding band, packing, or medium might be placed in the annular space *i* between the cap or shell H and extension *d* of the whirl. This arrangement is illustrated in Fig. 8, where said band, packing, or medium M is shown and said space as enlarged therefor.

Figure 9:
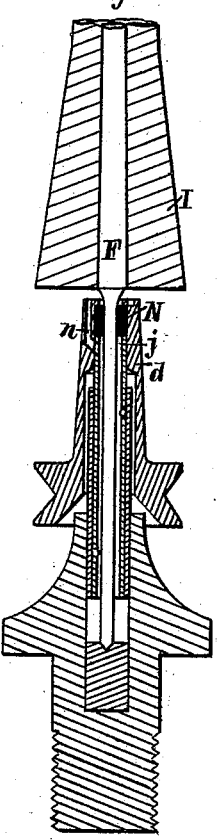
Figure 10:

When it is not deemed necessary to have the bobbin extend down over an enlarged part, as the cap H, the cap and shell may be entirely dispensed with, and an elastic, flexible, or yielding band, packing, or medium may be placed in the annular space *j* between the spindle and the extension *d* of whirl and whirl-shaft, as shown in Fig. 9, where said space is shown as enlarged for said band, packing, or medium N.

If it is not desired to make the small part *f* of the spindle so long in proportion to the other part of the spindle as shown on Sheet 1, the step G may project, as at *k* in Fig. 7, upward the required distance into the tube or shaft E.

The projecting tube or reservoir C may be entirely dispensed with, since oil may be poured directly into the tube A at the top after removing the spindle and whirl-shaft, or into the tube or shaft E by having an opening, *m*, in the cap H, as shown in Fig. 7, or an opening, *n*, in the extension *d*, when said cap is not used, as shown in Fig. 9.

I claim as my invention—

1. The combination of these elements—namely, a hollow shaft having one or more openings in its side or sides, a fixed bearing for said shaft, a spindle extending into said shaft, a fixed step for said spindle, and a yielding connection between said shaft and spindle, substantially as set forth.

2. The combination of these elements—namely, a spindle, a fixed step, a whirl, a tubular whirl-shaft having one or more openings in the side thereof, a tubular bearing for the whirl-shaft, and a yielding connection between said spindle and shaft, there being a space inside of said shaft between this shaft and the spindle, providing an unobstructed passage for oil, substantially as specified.

3. The combination, with a spindle, a whirl, a connection, substantially as described, between the spindle and whirl, and a hollow shaft for said whirl having one or more openings through its side, of a support having an external tubular bearing for said hollow shaft, and a passage at and around the end of said shaft, the shaft having interiorly a clear space between it and the lower end of the spindle, all substantially as described.

4. In combination, these elements—namely, a tubular shaft and bearing for the same, a spindle extending into said shaft, a yielding medium between the shaft and the spindle, and a step for the spindle, there being an annular space for the free and unobstructed flow of oil between the spindle and the inside of said shaft, there being also one or more passages for oil, through the side of said shaft, substantially as set forth.

5. The combination of these elements—namely, a spindle, a fixed step, a whirl and whirl-shaft, a fixed external bearing for the whirl-shaft, and a yielding medium between the spindle and whirl, substantially as and for the purpose set forth.

6. In combination, a whirl and shaft therefor, a fixed external bearing for said shaft, a spindle, a step for said spindle, a cap or shell, H, fixed to the spindle, and a yielding medium or connection between said cap or shell and the whirl, substantially as specified.

7. In combination, a fixed support and bearing, A, a whirl, D, a hollow shaft, E, a spindle, F, a step, G, a cap or shell, H, attached to the spindle, and a yielding medium or band, J, substantially as specified.

8. The combination of a fixed tubular support and bearing, A, a whirl, D, a hollow shaft, E, having one or more openings in the side or sides thereof, a spindle, F, a step, G, a cap or shell, H, and a yielding medium between said cap or shell and said whirl, substantially as described.

EDWARD DUMMER.

Witnesses:
SETH E. BROWN,
WM. H. DRURY.